US006727842B1

(12) United States Patent
Schleder et al.

(10) Patent No.: US 6,727,842 B1
(45) Date of Patent: Apr. 27, 2004

(54) DIGITAL IF PROCESSOR

(75) Inventors: William Edward Schleder, Dublin, OH (US); Michael Patrick Fink, Westerville, OH (US); Phillip Hoseog Yu, Lewis Center, OH (US)

(73) Assignee: L-3 Communications Avionics System, Inc., Grand Rapids, MI (US)

( * ) Notice: Subject to any disclaimer, the term of this patent is extended or adjusted under 35 U.S.C. 154(b) by 0 days.

(21) Appl. No.: 10/386,335

(22) Filed: Mar. 11, 2003

(51) Int. Cl.⁷ ......................... G01S 13/00; G01S 13/08
(52) U.S. Cl. ..................... 342/30; 342/40; 342/51; 342/194; 342/195
(58) Field of Search ...................... 342/30–32, 37, 342/40, 46, 51, 194–196

(56) References Cited

U.S. PATENT DOCUMENTS

| | | | |
|---|---|---|---|
| 5,072,224 A | * 12/1991 | Verbeke et al. | 342/152 |
| 5,387,915 A | 2/1995 | Moussa et al. | 342/40 |
| 5,477,225 A | * 12/1995 | Young et al. | 342/46 |
| 5,619,206 A | * 4/1997 | Cole et al. | 342/37 |
| 5,642,358 A | * 6/1997 | Dent | 370/323 |
| 5,712,628 A | * 1/1998 | Phillips et al. | 340/10.51 |

* cited by examiner

Primary Examiner—Thomas H. Tarcza
Assistant Examiner—Brian Andrea
(74) Attorney, Agent, or Firm—Calfee, Halter & Griswold LLP

(57) ABSTRACT

Apparatus for processing a signal of a predetermined intermediate frequency (IF) to generate in-phase (I) and quadrature (Q) components thereof comprises: an analog-to digital converter circuit for sampling and digitizing the IF signal to generate digitized data samples thereof at a sampling rate that produces consecutive digitized data samples that are separated in phase by a substantially fixed phase angle $2\pi/n$, where n is an integer greater than zero; first digital circuitry coupled to the analog-to digital converter circuit for demodulating the digitized data samples by multiplying every n consecutive digitized data samples with n respectively corresponding digital reference samples; and second digital circuitry coupled to the first digital circuitry for combining selected ones of the demodulated samples based on the substantially fixed phase angle to generate digital data samples of the I and Q components of the IF signal. The apparatus may include third digital circuitry coupled to the second circuitry for generating digital data samples of a log video component of the IF signal from the digital data samples of the I and Q components. The first, second and third digital circuitry may be programmed into a gate array integrated circuit.

28 Claims, 6 Drawing Sheets

Table 1: I/Q Demodulation Possible Combinations

| 30 MHz clock | Incoming Signal | Mixing Result | Simplified Result | Quadrant |
|---|---|---|---|---|
| 1, -1, -1, 1 | I, -Q, -I, Q | I, Q, I, Q | +I, +Q | 0-90° |
| -1, -1, 1, 1 | I, -Q, -I, Q | -I, Q, -I, Q | -I, +Q | 90° - 180° |
| -1, 1, 1, -1 | I, -Q, -I, Q | -I, -Q, -I, -Q | -I, -Q | 180° - 270° |
| 1, 1, -1, -1 | I, -Q, -I, Q | I, -Q, I, -Q | +I, -Q | 270° - 360° |

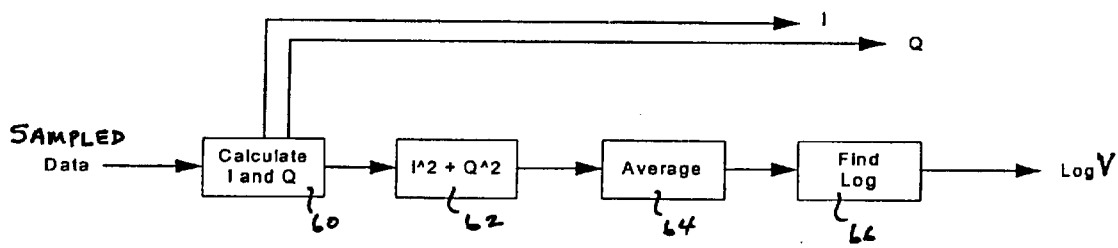
FIG. 3
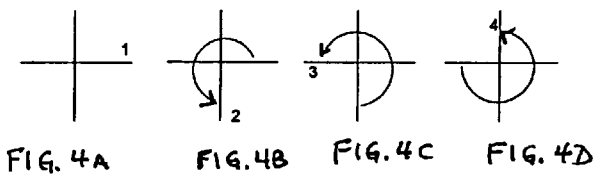
FIG. 4A   FIG. 4B   FIG. 4C   FIG. 4D
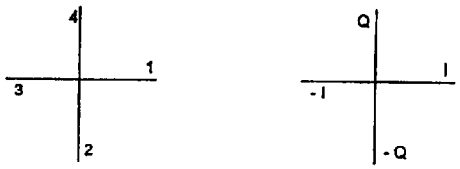
FIG. 5           FIG. 6
Table 1: I/Q Demodulation Possible Combinations
| 30 MHz clock | Incoming Signal | Mixing Result | Simplified Result | Quadrant |
|---|---|---|---|---|
| 1, -1, -1, 1 | I, -Q, -I, Q | I, Q, I, Q | +I, +Q | 0-90° |
| -1, -1, 1, 1 | I, -Q, -I, Q | -I, Q, -I, Q | -I, +Q | 90° - 180° |
| -1, 1, 1, -1 | I, -Q, -I, Q | -I, -Q, -I, -Q | -I, -Q | 180° - 270° |
| 1, 1, -1, -1 | I, -Q, -I, Q | I, -Q, I, -Q | +I, -Q | 270° - 360° |
FIG. 7

DIGITAL IF PROCESSOR

BACKGROUND OF THE INVENTION

The present invention is directed to intermediate frequency (IF) signal processors, in general, and more particularly, to a digital IF processor for sampling and digitizing an IF signal to generate digital data samples thereof at a sampling rate that produces consecutive samples separated in phase by a substantially fixed phase angle $2\pi/n$, where n is an integer greater than zero, and for processing such data samples digitally to generate digital data samples of in-phase (I), quadrature (Q) and log video (log V) components thereof, the digital IF processor preferably for use in an avionic system for detecting and decoding transponder reply signals from received radio frequency (RF) signals.

Avionic Systems are sometimes applied to the receiving and processing of radio frequency (RF) signals to establish certain information, like the range and bearing of the signal source and the signal information content, for example, which may provide guidance in the navigation of the aircraft. For example, an avionics system for warning of potential air-to-air collisions receives and processes RF signals transmitted from transponders of other aircraft. The operation of such avionic systems, generally referred to as traffic control and collision avoidance systems or TCAS, have been standardized by the Federal Aviation Administration (FAA). In such TCAS systems, the transponders of aircraft are interrogated from ground based radars or other aircraft with request for information signals at 1030 MHz. The transponders reply with signals at 1090 MHz which contain the requested information. Aircraft in the vicinity of the responding aircraft are equipped with avionics to receive and process the RF reply signals to determine range, bearing and altitude information for each responding aircraft. With this information, the avionic system of the receiving aircraft may determine whether or not the responding aircraft is a threat to air-to-air collision therewith and provide a warning thereof.

An exemplary TCAS used in present aircraft is shown in the block diagram schematic of FIG. 1. Generally, these systems include an omni-directional antenna 10 mounted on top of the aircraft for receiving transponder reply signals at 1090 MHz from other aircraft. The antenna 10 may be configured to generate $\Sigma$ and $\Delta$ signal components of the reply signals which are supplied to a receiver of the avionics. Typically, the receiver which consists of analog circuitry comprises an RF section 12 for demodulating the RF $\Sigma$ and $\Delta$ signals to IF $\Sigma$ and $\Delta$ signals, denoted as $\Sigma'$ and $\Delta'$ respectively; and an IF section 14 for further demodulating the $\Sigma'$ and $\Delta'$ signals to lower IF or baseband signals, denoted as $\Sigma''$ and $\Delta''$, respectively. The IF section 14 may also produce a log V signal component. Further included in the avionics is a phase comparator circuit 16 which processes the $\Sigma''$ and $\Delta''$ signals to produce the I and Q components thereof. One or more analog-to-digital converters (A/D) 18 digitize the I, Q and log V signals at a predetermined sampling rate and the digitized samples of the I, Q and log V signals are temporarily stored in a set of buffers 20 for later processing in a reply digital processor 22. Reference is made to the U.S. Pat. No. 5,387,915, issued Feb. 7, 1995, entitled "Method and Apparatus For Detecting and Decoding Transponder Reply Signals", and assigned to the same assignee as the instant application, for a more detailed description of the structure and operation of TCAS I avionics.

Such avionics are always under scrutiny for improvement, like reducing costs, weight, size, production time and adaptability for changing functionality and compensating for noise interference, for example. The present invention of a digital IF processor replaces the current analog circuitry for IF signal processing, denoted as 24 in FIG. 1, and affords the aforementioned improvements thereover.

SUMMARY OF THE INVENTION

In accordance with one aspect of the present invention, apparatus for processing a signal of a predetermined intermediate frequency (IF) to generate in-phase (I) and quadrature (Q) components thereof comprises: an analog-to digital converter circuit for sampling and digitizing the IF signal to generate digitized data samples thereof at a sampling rate that produces consecutive digitized data samples that are separated in phase by a substantially fixed phase angle $2\pi/n$, where n is an integer greater than zero; first digital circuitry coupled to the analog-to digital converter circuit for demodulating the digitized data samples by multiplying every n consecutive digitized data samples with n respectively corresponding digital reference samples; and second digital circuitry coupled to the first digital circuitry for combining selected ones of the demodulated samples based on the substantially fixed phase angle to generate digital data samples of the I and Q components of the IF signal. The apparatus may include third digital circuitry coupled to the second circuitry for generating digital data samples of a log video component of the IF signal from the digital data samples of the I and Q components.

In accordance with another aspect of the present invention, a digital intermediate frequency (IF) processor for processing IF sum ($\Sigma$) and delta ($\Delta$) signals to generate in-phase (I) and quadrature (Q) components of each of the $\Sigma$ and $\Delta$ signals comprises: a first analog-to digital converter circuit for sampling and digitizing the IF $\Sigma$ signal to generate digitized data samples thereof at a sampling rate that produces consecutive digitized data samples of the IF $\Sigma$ signal that are separated in phase by a substantially fixed phase angle $2\pi/n$, where n is an integer greater than zero; a second analog-to digital converter circuit for sampling and digitizing the IF $\Delta$ signal to generate digitized data samples thereof at the sampling rate to produce consecutive digitized data samples of the IF $\Delta$ signal that are separated in phase by the substantially fixed phase angle; a first digital IF channel coupled to the first analog-to digital converter circuit for processing the digitized data samples of the IF $\Sigma$ signal to generate digitized data samples of the I and Q components thereof, a second digital IF channel coupled to the second analog-to digital converter circuit for processing the digitized data samples of the IF $\Delta$ signal to generate digitized data samples of the I and Q components thereof, and wherein each of the I and Q digital IF channels including: first digital circuitry coupled to the corresponding analog-to digital converter circuit for demodulating the digitized data samples by multiplying every n consecutive digitized data samples with n respectively corresponding digital reference samples; and second digital circuitry coupled to the first digital circuitry for combining selected ones of the demodulated samples based on the substantially fixed phase angle to generate digital data samples of said I and Q components of the corresponding IF signal. Each digital IF channel of the processor may include third digital circuitry coupled to the corresponding second circuitry for generating digital data samples of a log video component of the corresponding IF signal from the digital data samples of the I and Q components thereof.

In accordance with yet another aspect of the present invention, an avionic system for detecting and decoding transponder reply signals from received radio frequency (RF) signals comprises: an antenna for receiving the RF signals and configured to produce sum ($\Sigma$) and delta ($\Delta$) component signals thereof; an RF receiver circuit for demodulating the RF $\Sigma$ and $\Delta$ component signals into intermediate frequency (IF) $\Sigma$ and $\Delta$ component signals, respectively; a first analog-to digital converter circuit for sampling and digitizing the IF $\Sigma$ signal to generate digitized data samples thereof at a sampling rate that produces consecutive digitized data samples of the IF $\Sigma$ signal that are separated in phase by a substantially fixed phase angle $2\pi/n$, where n is an integer greater than zero; a second analog-to digital converter circuit for sampling and digitizing the IF $\Delta$ signal to generate digitized data samples thereof at the sampling rate to produce consecutive digitized data samples of the IF $\Delta$ signal that are separated in phase by the substantially fixed phase angle; a first digital IF channel coupled to the first analog-to digital converter circuit for processing the digitized data samples of the IF $\Sigma$ signal to generate digitized data samples of the in-phase (I), quadrature (Q) and log video (log V) components thereof; a second digital IF channel coupled to the second analog-to digital converter circuit for processing the digitized data samples of the IF $\Delta$ signal to generate digitized data samples of the I, Q and log V components thereof; and a reply processor for processing the digitized data samples of the I, Q and log V components of each of the IF $\Sigma$ and $\Delta$ signals to detect and decode transponder reply signals.

BRIEF DESCRIPTION OF THE DRAWINGS

FIG. 3 is a block diagram schematic of an exemplary digital IF channel suitable for use in the embodiment of FIG. 2.

FIGS. 4A–4D are graphs of an I/Q phase circle suitable for use in describing the relationship between the frequency of the IF signal and the sampling rate of a digital IF channel.

FIGS. 5 and 6 are graphs of an I/Q phase circle which illustrate a fixed phase angle relationship between consecutive data samples of the digital IF channel.

FIGS. 7 is a table illustrating possible I/Q demodulation combinations for the digital IF channel.

DETAILED DESCRIPTION OF THE INVENTION

Figure 1:
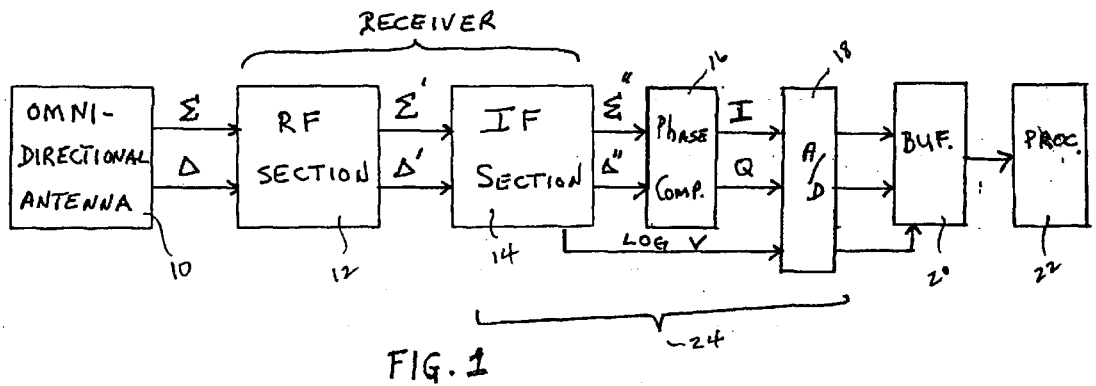
FIG. 1 is a block diagram schematic of an avionic system for detecting and decoding transponder reply signals from RF signals suitable for embodying one aspect of the present invention.
Figure 2:
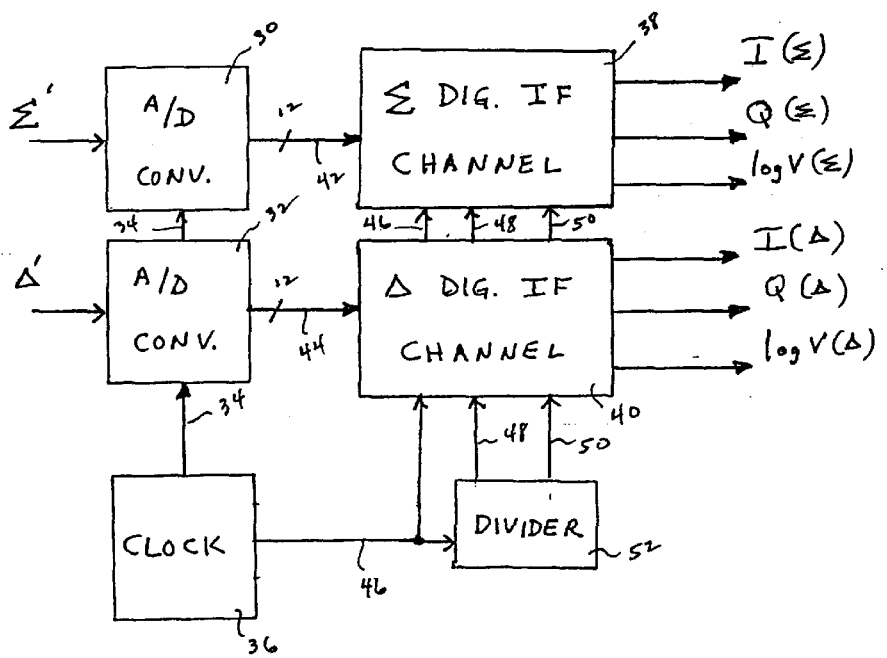
FIG. 2 is a block diagram schematic of an exemplary digital IF processor suitable for embodying another aspect of the present invention.

An exemplary digital IF processor suitable for embodying the broad principles of the present invention is shown in the block diagram schematic of FIG. 2. Referring to FIG. 2, each of the $\Sigma'$ and $\Delta'$ signals received from the RF section 12, for example, are digitized in respective A/D converters 30 and 32 which may be of the flash conversion type. The sampling rate of the digitizers 30 and 32 is governed by a clock signal 34 generated by a digital clock circuit 36. In the present embodiment, the RF section 12 is configured to modulate the $\Sigma$ and $\Delta$ signals to IF signals $\Sigma'$ and $\Delta'$ of 30 MHz and the sampling rate of clock signal 34 is set at 40 MHz. The advantages of these particular settings will become evident from the following description.

The resulting sampled data words from the converters 30 and 32, which may be 12 bits each, for example, are coupled to respective digital IF processing channels 38 and 40 over data lines 42 and 44, respectively. The digital circuits of both channels 38 and 40 are operated synchronously by the 40 MHz clock signal generated by the clock circuit 36 over signal line 46 and by two clock signals 48 and 50 divided from the clock signal 46 by a clock divider circuit 52. In the present embodiment, the clock signals 48 and 50 may be 20 MHz and 10 MHz, respectively. Each channel 38 and 40 processes the digitized data samples of its respective IF signal to produce digital data samples of the I, Q and log V components thereof, which are denoted in FIG. 2 as I($\Sigma$), Q($\Sigma$) and log V($\Sigma$) and I($\Delta$), Q($\Delta$) and log V($\Delta$).

An exemplary embodiment of a digital IF channel suitable for use in the embodiment of FIG. 2 is shown in the functional block diagram schematic of FIG. 3. The digitized data samples of the IF signal, be it $\Sigma'$ or $\Delta'$, are provided to a functional block 60 in the same sequential order as they are digitized, and may be provided in real time, i.e as they are being digitized, but this need not be the case. The functional block 60 digitally calculates the I and Q components thereof. The digital process used for performing this function in the present embodiment will now be described in greater detail.

As noted above, for the present embodiment, the RF section is configured to provide 30 MHz IF signals $\Sigma'$ and $\Delta'$ from either of the 1090 MHz or the 1030 MHz RF signals as a sinusoidal wave with a range of approximately 0 to 2 Vpp (peak-to-peak voltage). Sampling and digitizing the 30 MHz IF signals $\Sigma'$ and $\Delta'$ at 40 MHz results in a 90°-phase shift between the I and Q components that corresponds exactly to one clock time delay or 25 nanoseconds (ns). Therefore, the data samples of the I and Q components are simply one clock period or time delay apart from each other at all times (since by definition, I and Q are 90° apart).

This is illustrated in the phase circle diagrams of FIG. 4A–4D wherein the abscissa represents the I component and the ordinate represents the Q component. Since the 30 MHz signal has a period of T=33.333 ns and the 40 MHz clock signal has a period of T=25 ns, then the ratio of 25 ns/33.333 ns results in 0.75. So, as the 30 MHz IF signal goes around the phase circle during each period thereof, it is sampled and digitized at the time intervals of the 40 MHz clock every ¾ of a rotation such as shown in the diagrams of FIGS. 4A–4D. More specifically, let us assume that each diagram of the FIGS. 4A–4D represents a time sampling of the 40 MHz clock. Then, if the IF signal is first sampled and digitized at a phase angle of 0°, the next consecutive three samples will occur at phase angels of 270°, 180° and 90°, respectively, which may be thought of as the samples 1, 2, 3, 4 going backwards at 90° per sample as shown in the phase circle diagram of FIG. 5. Note that the 4 phase samples will repeat periodically and continuously at 100 ns intervals.

In the present embodiment, it is desirable to provide the resulting I and Q components at baseband. This may be accomplished through either a discrete Fourier transformation (DFT) or a 30 MHz demodulation of the IF signal. Let us start with an analysis of a DFT transformation of the IF signal. The DFT is a function of "k", which represents different frequencies of the DFT, and x[n] is the value of the IF signal at different sampled points in time.

The real part of a DFT may be expressed as:

$$I_k = \sum_{n=0}^{N-1}(x[n]*\cos(2\pi kn/N)) \quad k=0,1,\ldots N/2$$

And the imaginary part may be expressed as:

$$Q_k = -(\sum_{n=0}^{N-1}(x[n]*\sin(2\pi kn/N)) \quad k=0,1,\ldots N/2$$

Substituting N=4, the above equations reduce to:

$$I_k = \sum_{n=0}^{3}(x[n]*\cos(\pi kn/2)) \quad k=0,1,2$$

$$Q_k = -(\sum_{n=0}^{3}(x[n]*\sin(\pi kn/2))) \quad k=0,1,2$$

This then can be rewritten as:

$$I_k = x[0]*\cos(0) + x[1]*\cos(\pi k/2) + x[2]*\cos(\pi k) + x[3]*\cos(3\pi k/2)$$

$$Q_k = -x[0]*\sin(0) - x[1]*\sin(\pi k/2) - x[2]*\sin(\pi k) - x[3]*\sin(3\pi k/2)$$

In reality, the IF signal may be sampled at any time, but for convenience it will be assumed that it is sampled a 0°, 90°, 180°, and 270° phase angles, where the values of x[n] will be simply 1 or 0. As discussed earlier, this sampling of the IF signal is periodic and will repeat after every 4 samples. The real part of x[n] is the cosine value of the sampled IF signal at those four sampling points, and the imaginary part is the sine value of the sampled IF signal at the same four sampling points. To find the real or in-phase value of the transformation, the real value of x[n] is taken, and to find the imaginary or quadrature value of the transformation, the imaginary value of x[n] is used.

The real component of x[n] at the four chosen sampling points s as follows.

$$x[0] = \cos(0) = 1$$

$$x[1] = \cos(90) = 0$$

$$x[2] = \cos(180) = -1$$

$$x[3] = \cos(270) = 0$$

The imaginary component of x[n] at the four chosen sampling points is as follows:

$$x[0] = \sin(0) = 0$$

$$x[1] = \sin(90) = 1$$

$$x[2] = \sin(180) = 0$$

$$x[3] = \sin(270) = -1$$

So then $I_k$ and $Q_k$ further simplify to:

$$I_k = \cos(0) - \cos(\pi k) \quad k=0,1,2$$

$$Q_k = -(1)*\sin(\pi k/2) + \sin(3\pi k/2) \quad k=0,1,2$$

Since k has values at 0,1 and 2, the DFT is evaluated at those points as follows:

$$I_0 = \cos(0) - \cos(0) = 0,$$

$$I_1 = \cos(0) - \cos(\pi) = 2,$$

$$I_2 = \cos(0) - \cos(2\pi) = 0; \text{ and}$$

$$Q_0 = -(1)*\sin(0) + \sin(0) = 0$$

$$Q_1 = -(1)*\sin(\pi/2) + \sin(3\pi/2) = -2$$

$$Q_2 = -(1)*\sin(\pi) + \sin(3\pi) = 0$$

From the foregoing equations, the only value of k that produces a non-zero value is at k=1. At the other values of k, the signal is being subtracted from itself resulting in a zero result. Therefore, the only useful part of the DFT is at k=1.

Thus, the DFT provides for I and Q in accordance with the following expressions:

$$I = \cos(0) - \cos(\pi), \text{ and}$$

$$Q = \cos(3\pi/2) - \sin(\pi/2),$$

If 0° phase is arbitrarily selected as the present value of the IF signal sample, the other samples along the phase circle are behind that in time. Remember that $\pi/2$ equals one clock time delay. So, to calculate "I", the sample value of the IF signal delayed by two clock times ($\pi$) is subtracted from the present sample value of the IF signal, and to calculate "Q", the sampled value of the IF signal delayed by one clock time ($\pi/2$) is subtracted from the three clock time delayed sampled ($3\pi/2$) value of the IF signal.

Assume the incoming signal is $V_{in}$ and that $Z^{-1}$ equals one time delay, then the following expressions represent the I and Q sampled values over time resulting from the DFT:

$$V_I = V_{in}(1 - Z^{-2}), \text{ and}$$

$$V_Q = V_{in}(Z^{-1} - Z^{-3}).$$

The other method of producing the I and Q components at baseband is by demodulating the IF signal with a reference 30 MHz sine wave. With this method, the incoming IF signal moves in phase relative to the 30 MHz reference signal. Therefore, the real component of the reference 30 MHz sine wave, when sampled at 40 MHz (with an assigned amplitude of 1, so the amplitude of the IF signal is not affected) will follow the pattern of 1, 0, −1, 0 for samples 1, 2, 3 and 4 as it goes around the phase circle (see FIG. 5). This pattern will always be the same, but it will shift depending on whether the interest is in the real or the imaginary components. Accordingly, the imaginary component follows the pattern of 0, −1, 0, 1 (see FIG. 5). As explained above, it is known that I and Q are always one time sample apart. So the time samples of the IF signal are alternating between I and Q. Therefore, for purposes of modulation with the reference 30 MHz sine wave, the periodic four time samples of the IF signal may be multiplied by respectively corresponding values 1, 1, −1, −1 which produces a mixed sampled data signal that is still alternating between I and Q for consecutive time sampled values (I, Q, I, Q, etc.). So every other time sampled value of the IF signal may be added together to produce time sampled values of the I and Q components thereof.

Another way of viewing this method is by referring to the phase circles of FIGS. 5 and 6. The phase circle may be considered a "snapshot" of 100 ns of the IF signal (remember, 25 ns equals 90 degrees of phase). To get the I component data without it effectively canceling out (i.e. I+(−I)=0), it is necessary to take either +I−(−I) or −I−(+I). The same situation is true for the Q data. Since the IF signal is essentially being sampled in a pattern of I, −Q, −I, Q (see FIGS. 5 and 6), by multiplying these four consecutive samples by 1, 1, −1, −1, the result is I, −Q, I, −Q. This prevents any canceling of the I and Q components. Of course, the IF signal and the 30 MHz reference signal will not always be synced up like in the above example. Table 1 of FIG. 7 shows the other possibilities.

Referring to Table 1 of FIG. 7, by mixing the IF signal with the 30 MHz reference signal, the I and Q components may be combined as described above so that the combined amplitudes thereof are always additive (regardless of if it is positive or negative), and never cancel out. The I and Q sampled data from the Simplified Result column of Table 1 shows how the data can then translate into the quadrant location of the IF signal. The angle that is found is relative to the 30 MHz free running reference sine wave signal. It is not possible to determine if the starting phase of the reference signal is in sync with the starting phase of the IF signal. Therefore, this resulting angle cannot be used to find the direction of the signal. However, the angle found can be used to determine 180-degree phase shifts.

The foregoing described method of demodulating with a 30 MHz sine wave reference signal may be used in block 60 of the channel embodiment of FIG. 3 to calculate the I and Q data samples. A more detailed embodiment thereof will be described herebelow in connection with the functional block diagrams of FIGS. 8A and 8B.

Pulses are used to communicate informational data in the transponder reply signals as discussed herein above. A pulse is an envelope of the RF carrier of the reply signal and is generally detected based on the strength of the signal of the envelope. The log of the magnitude of the pulse signal is determined in order to get a large dynamic range from which to detect the pulses of the reply signal. The magnitude may be determined by using Pythagoras' theorem on the I and Q data samples. Accordingly, the magnitude M squared is equal to the sum of $I^2$ and $Q^2$ as expressed below:

$$M^2 = I^2 + Q^2.$$

Since the log of the magnitude is the desired result (and not the magnitude itself), there is no need to take the square root of $(I^2+Q^2)$. By taking the log, the squared factor of the magnitude is reduced to a scaling factor that does not effect the relative magnitude value as shown by the following expression:

$$\log_2(M^2) = 2*\log_2(M).$$

Therefore, to find the log of the magnitude, one need only take the log of $(I^2+Q^2)$ as shown by the following expression:

$$\log_2(M) = \log_2(I^2+Q^2).$$

Referring back to FIG. 3, the I and Q data samples calculated by block 60 are provided to functional block 62 wherein the square of the I and Q data samples are calculated and summed. The resultant sum is averaged in block 64 and the log to the base 2 is determined in block 66 which outputs log V or magnitude data samples from which pulses may be detected by downstream processing thereof.

Figure 8A:
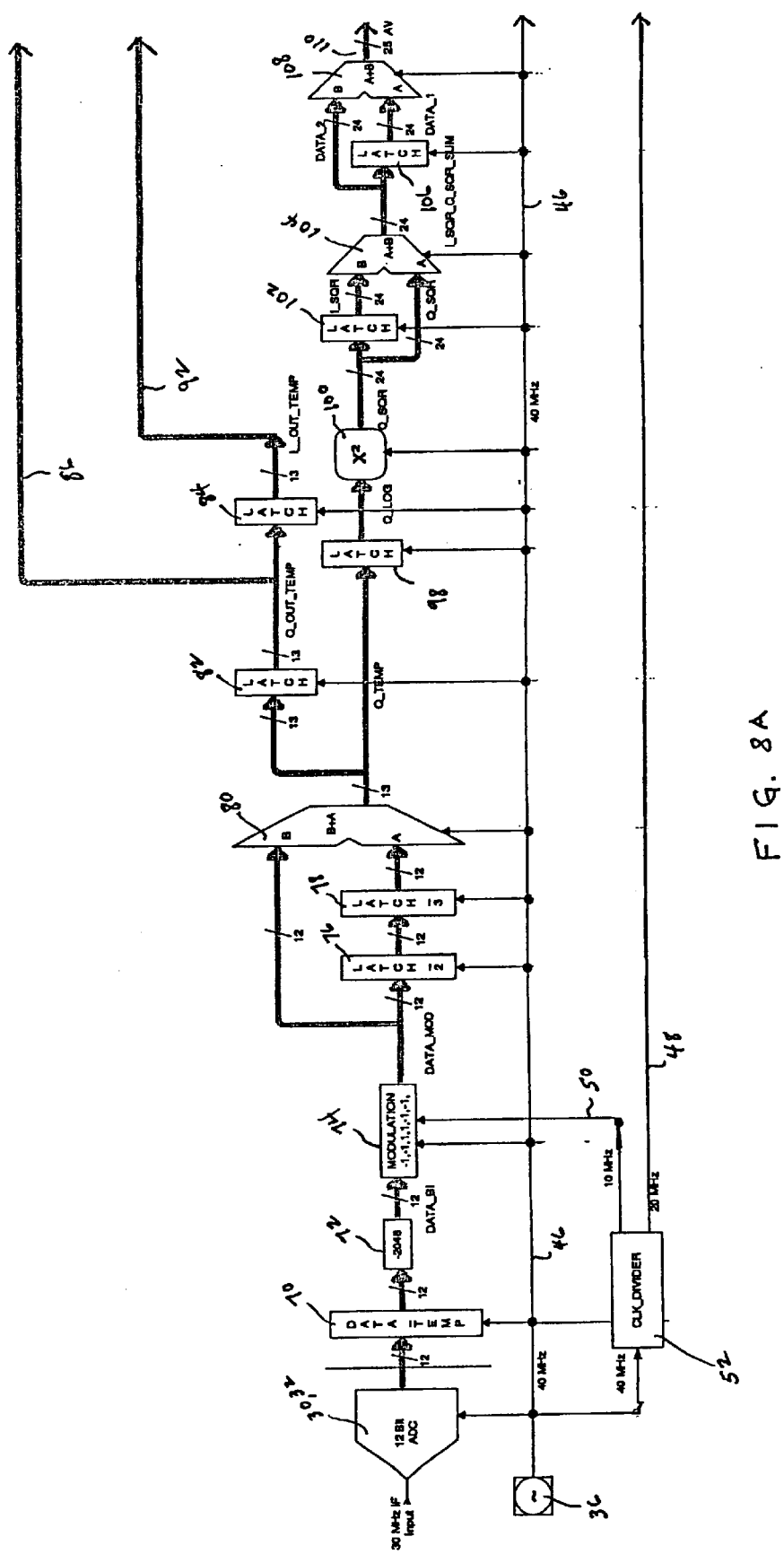
FIGS. 8A–8B taken together is a schematic diagram of an exemplary digital IF channel suitable for embodying certain aspects of the present invention.
Figure 8B:
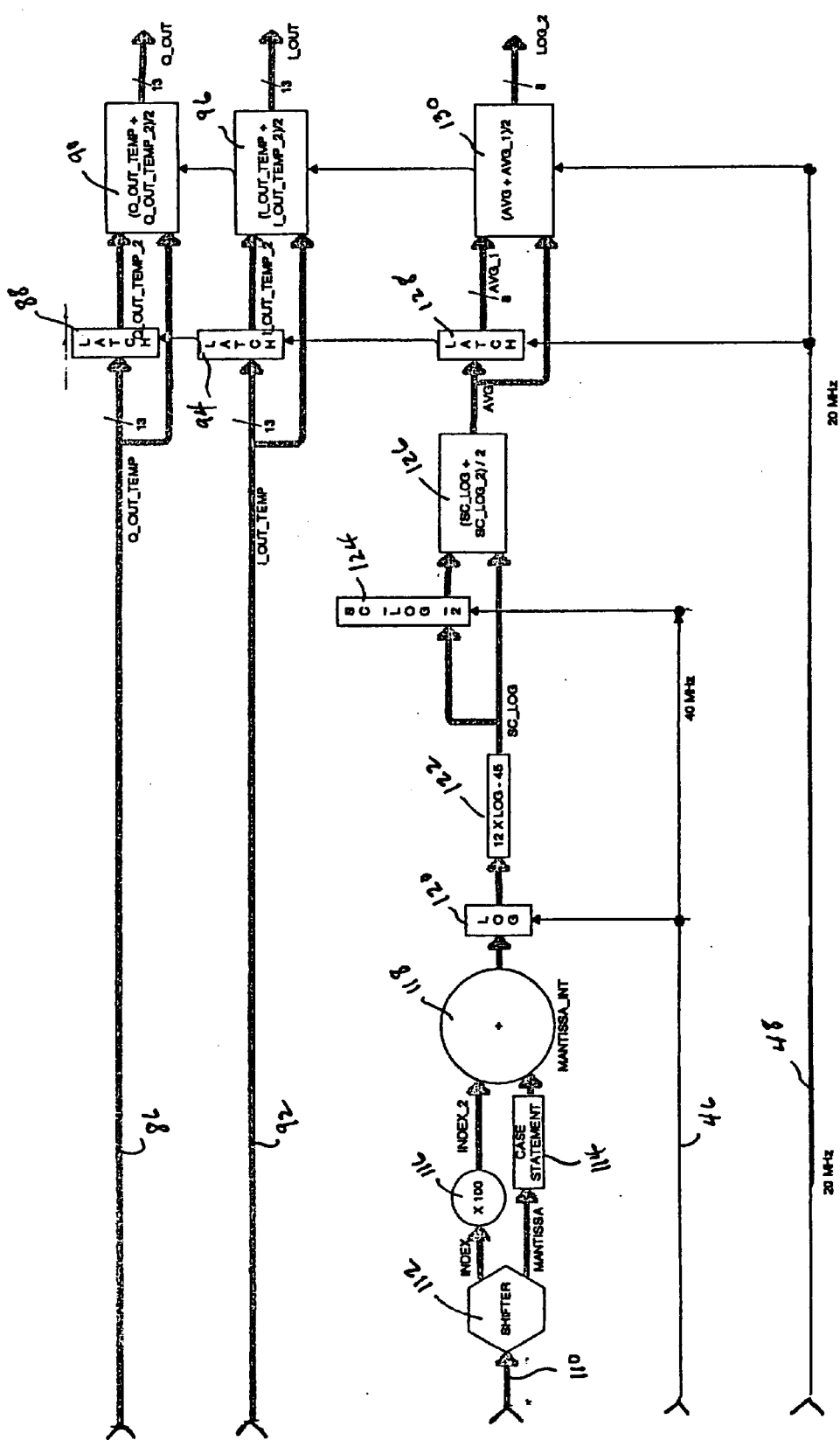

A more detailed embodiment of the digital IF channel is shown in the functional block diagram of FIG. 8A and 8B. Reference numerals of like components described in connection with the embodiment of FIG. 3 will remain the same. Referring to FIGS. 8A and 8B, as described above, the clock divider 52 produces the 20 MHz and 10 MHz clock signals divided from the 40 MHz clock signal, and thus synchronized therewith. The 40 MHz clock signal is distributed over signal line 46 to most of the functional blocks of the embodiment for effecting a time sampled synchronous operation thereof. In addition, the 20 MHz and 10 Mhz clock signals are distributed over signal lines 48 and 50, respectively, to selected ones of the functional blocks as will be noted in the description herein below.

Data samples of the 30 MHz IF signal are digitized at a rate of 40 MHz by the A/D converter 30,32 resulting in digitized data samples of 12-bits each (range 0 to 4095). Due to the signal and how it is clocked, it will always follow a pattern of hi, mid, low, mid, etc. Each digitized data sample is buffered in a temporary data register 70 and rendered bipolar by subtracting 2048 therefrom in block 72. After being made bipolar, each digitized data sample falls within the binary range of +2047 and −2048. In block 74, consecutive bipolar digitized data samples are demodulated with the pattern of +1, +1, −1, −1, etc. as described herein above. The 10 MHz clock signal is used in the code to generate the +1, +1, −1, −1 pattern. Two latch registers 76 and 78 connected in series and operated by the 40 MHz clock effect a two clock period delay of the demodulated data samples of demodulator block 74. An adder 80 sums the present demodulated data sample from the demodulator 74 with the output of register 78 which is the demodulated data sample from the demodulator 74 delayed by two clock periods. In effect, the summer 80 is summing together every other demodulated data sample to add I data samples together and Q data samples together.

The resultant summation of block 80 provides that mid amplitude valued data samples are always added together and that hi and low amplitude valued data samples are always added together. Also, whenever a high and low valued data sample are added, the result is either a +hi and −low which may have a max amplitude value of +4095 or a −hi and a +low which may have a max amplitude value of −4095. This ensures the output of the summer 80 will always be in the range of −4095 to +4095 or 12 bits plus a sign bit. Each summed data sample of the summer 80 is captured in latch register 82 and each data sample captured in register 82 is subsequently captured in latch register 84. That is, the sampled data outputs of latch registers 82 and 84 are always separated by one clock period or 90°.

The data samples output from register 82 are distributed over lines 86 to a latch register 88 and to one input of another summer 90 and the output of register 88 is coupled to another input of summer 90. Latch register 88 and summer 90 are operated by the 20 MHz clock which effects the summing together of every other data sample output from register 82 to produce a bipolar digital (13 bits) 2 data sample average of the Q component every 50 ns. Similarly, the data samples output from register 84 are distributed over lines 92 to a latch register 94 and to one input of another summer 96 and the output of register 94 is coupled to another input of summer 96. Latch register 94 and summer 96 are also operated by the 20 MHz clock which effects the summing together of every other data sample output from register 84 to produce a bipolar digital (13 bits) 2 data sample average of the I component every 50 ns. The foregoing described functional elements 70 through 96 comprise an exemplary embodiment of the I and Q calculator 60 of the digital IF channel embodiment of FIG. 3.

The 13 bit data samples of summer 80 are also captured in a latch register 98 and squared in the functional block 100. Note that squaring each data sample in the squarer 100 essentially removes the sign bit thereof to produce unipolar 24 bit squared data samples. The squared data samples from the squarer 100 are captured in a latch register 102 and also coupled to one input of a summer 104. The output of latch register 102 is coupled to another input of summer 104. Thus, the summer 104 sums the squared data sample output from the squarer 100 with the squared data sample captured by the register 102 which is always one clock period delayed (remember, one clock period delay equals 90°) to produce 24 bit data samples each representative of $I^2+Q^2$. Note that the resultant data samples produced from the summer 104 are always alternating between large (hi and low added together) and small (two mid values added together). Therefore the sum of the squared values will never exceed a value greater than 24-bits. The foregoing described elements 98–104 comprise an exemplary embodiment of the block 62 of the channel embodiment of FIG. 3.

Next, the $I^2+Q^2$ data samples output from the summer 104 are captured in a latch register 106 and coupled to one input of another summer 108. The output of latch register 106 is coupled to another input of summer 108. Thus, the summer 108 sums each consecutive two $I^2+Q^2$ data samples to effect 25 bit data samples representative of a 2-sample running average of the $I^2+Q^2$ data samples. In the present embodiment, the averaged data samples are not divided by 2 to avoid a possible loss of accuracy due to unnecessary rounding of the digital number. The foregoing described elements 106 and 108 comprise an exemplary embodiment of the block 64 of the channel embodiment of FIG. 3.

In the remaining blocks of FIGS. 8A–8B, the logarithm to the base 2 of the average $I^2+Q^2$ data samples are calculated. As explained above, it is not necessary to calculate the square root of the samples prior to calculating the logarithm thereof because the exponent ½ of the root term is merely a scale multiplier of the log term. This is shown by the following expression:

$$\log_2(I^2+Q^2)^{1/2} = \tfrac{1}{2}\log_2(I^2+Q^2).$$

Initially, the 25 bit data samples output from the summer 108 are provided over signal lines 110 to a shifter functional block 112 wherein the digital code of each sample is shifted from the most significant bit MSB to the least significant bit (LSB) looking for the bit location containing a first "1" of the 25 bit code. This bit location is representative of the index of the log base 2 conversion. The next 5 bits after the first "1" (i.e. going from MSB to LSB) are taken by the block 112 and used to access a lookup table 114 to find a digital code for the mantissa of the log base 2 conversion. In this process, exceptions will exist for log conversions that have an index bit location lower than 5. The index or bit location is digitally multiplied by 100 in block 116 and then, added to the digital code of the mantissa in summer 118. The resultant sum which is the log base 2 of the data sample is captured in a latch register 120. Accordingly, with each new clock pulse of the 40 MHz clock, a log base 2 data sample is captured in the register 120.

For example, if the 25 bit digital code of a present data sample is "0 0010 11100101 0100 0011 1011" with bit locations numbered from 24 (MSB) down to 0 (LSB), then the index is 21 and the following 5 bits are "01110". These 5 bits are used to access the look up table to find a mantissa of 54. In the process, the index is multiplied by 100 yielding 2100 and added to the mantissa 54 resulting in a digital code of 2154. The decimal is presumed to be two places to the left. So the log base 2 value of the present digital sample captured in register 120 is 21.54.

In the present embodiment, the log base 2 of each averaged digital sample of $I^2+Q^2$ is scaled in block 122 to have 64 dB of dynamic power range by using 8 bits (i.e. 0–255). To find a log curve to achieve this, the following scaled log equations were solved for slope K and offset m:

$$K*\log_2 2^{25}+m=255, \text{ and } K*\log_2 2^{25/10^{6.4}}+m=0.$$

The above two equations represent that at maximum value ($\log_2$ value=25), the scaled log base 2 is set to 255, and at minimum value (i.e. 64 dB down), the scaled log base 2 is set to 0. The system power limits are set to go from 84 dBm to 20 dBm, for example. Since the 64 dB is a power range, it is therefore divided by 10 (as opposed to 20 for voltage) to find the true value. So 64 dB is equal to $10^{\wedge}(64/10)$ or $10^{\wedge}6.4$ as shown in the above equation. A simultaneous solution of the above two equations result in K and m being equal to 11.99 and −44.85, which may be rounded off to 12 and 45, respectively.

So the equation for the scaled log of X is simplified to:

Scaled Log=12*X−45, where X is the log base 2 of the present averaged data sample of $I^2$ and $Q^2$ being processed in block 122. To complete the example from above, the scaled log of 21.54 would be calculated in block 122 as follows:

Scaled Log=12*(21.54)−45=213, where an 8-bit code representative of 213 is output from block 122 for the present log base 2 data sample.

Each scaled log data sample is captured in a latch register 124 and coupled to one input of a summer 126. The output of the register 124 is coupled to the other input of the summer 126. The combination of register 124 and summer 126 process the scaled log data samples output from scaler 122 to produce 8 bit data samples representative of a 2 sample running average of the scaled log data samples. A similar 2 sample running average is performed by the combination of latch register 128 and summer 130 on the 8 bit data samples output from summer 126. Note that register 128 and summer 130 are operated by the 20 MHz clock so that in effect the combination produces every 50 ns an 8 bit data sample representative of a 4 sample running average of the 8 bit data samples output from summer 126. The resultant 8 bit data samples output from the summer 130 are representative of the data samples of the log V component of the IF signal. The foregoing described elements 112–130 comprise an exemplary embodiment of the block 66 of the channel embodiment of FIG. 3.

The dual digital IF channels 38 and 40 for the processing of the Σ and Δ IF signals, respectively, as described herein above may be programmed into a gate array integrated circuit 140 such as shown in the block diagram schematic of FIG. 9. The gate array 140 may be a field programmable gate array (FPGA) of the type manufactured by Xilinx® of the Spartan 2® variety bearing model number 2S150PQ208, for example, which has 150,000 gates and is capable of running at a clock rate of 40 MHz. The more salient advantages of using an FPGA integrated circuit or chip are reductions in cost, weight, size, production time, and improved adaptability. One chip may cost as little as approximately $25, may be just a bit larger than a quarter, and is very light. Of course, the cost and size of the chip may be further reduced with development over time. The production time for the dual digital IF channel design is shorter because only one main component is disposed on a PC board, and it may not have any tolerance constraints, as opposed to the current analog design. Also, there are not as many issues with noise interference because of the all digital processing, and the functions programmed into the FPGA may be re-programmed without removing it from the PC board.

In the present embodiment, a program for the FPGA according to the foregoing described embodiment of FIGS. 8A and 8B, is produced using an Active-HDL™ (high level design language) interface, but it may be also produced using Innoveda eProduct Designer™ interface with Viewlogic™ as a block diagram drawing tool. Accordingly, the code for programming the FPGA may be written in VHDL, synthesized in FPGA express, and implemented in Xilinx Design Manager. For preparing the VHDL program code, the functional embodiment of each channel described in connection with FIGS. 8A and 8B herein above is broken down into VHDL files as shown in FIGS. 10A and 10B which are consistent with the function blocks of FIG. 3.

Figure 10B:
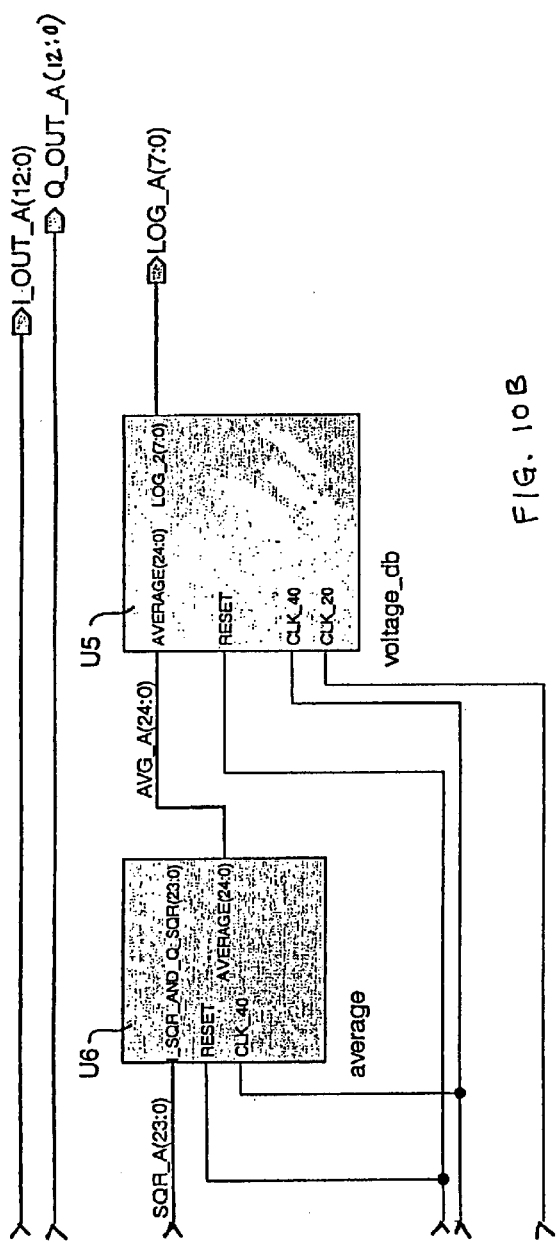
FIGS. 10A–10B taken together is a schematic diagram illustrating exemplary VHDL files and their interconnections suitable for programming a gate array integrated circuit in accordance with yet another aspect of the present invention.
Figure 10A:
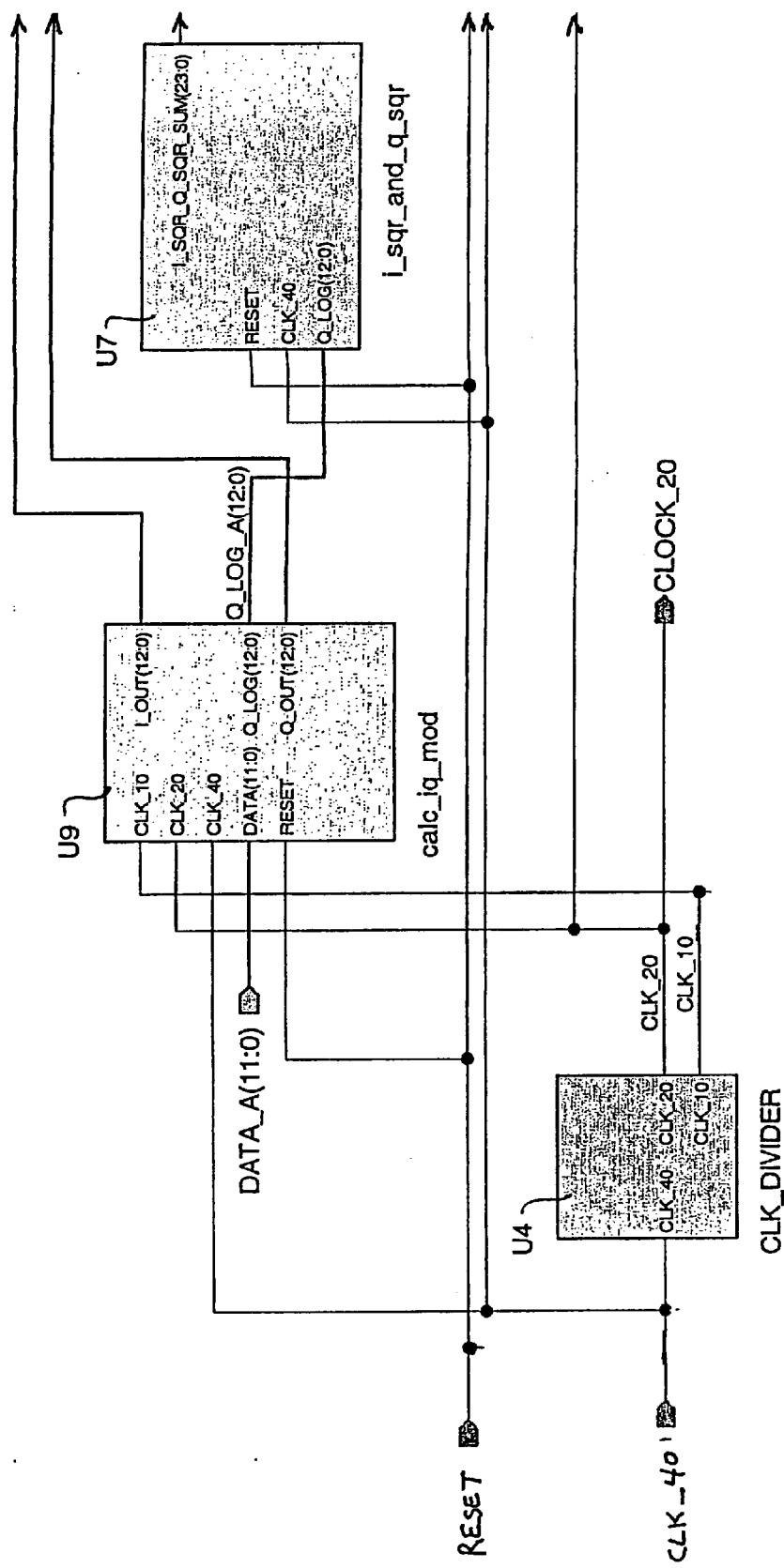

Referring to FIGS. 10A and 10B, a VHDL clock divider file U4 entitled "clk_divider" is consistent with block 52, a VHDL calculate I and Q components file U9 entitled "calc_iq_mod" is consistent with functional block 60, a VHDL calculate $I^2+Q^2$ file U7 entitled "i_sqr_and_q_sqr" is consistent with functional block 62, a VHDL average file U6 entitled "average" is consistent with functional block 64 and a VHDL calculate log V file U5 entitled "voltage_db" is consistent with functional block 66. Exemplary VHDL program code for these five files is shown in Appendix I appended hereto. In addition, the legends for the various signals shown in FIGS. 8A–8B and 10A–10B are consistent with VHDL code of Appendix I.

Figure 9:
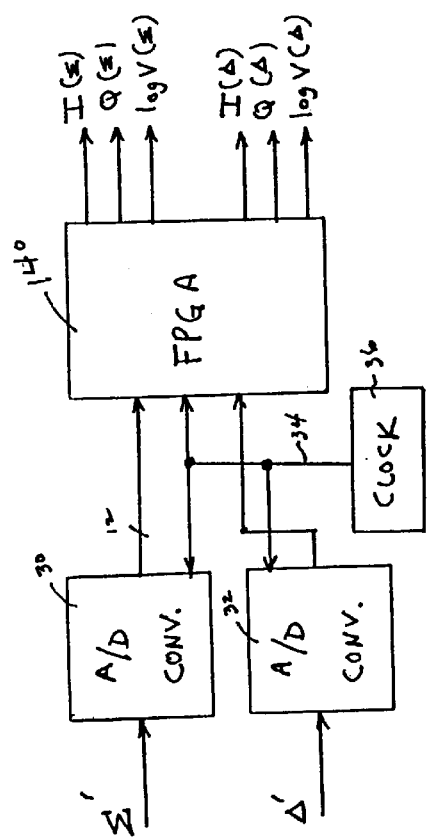
FIG. 9 is a block diagram schematic of yet another aspect of the present invention.

While the present embodiment as illustrated in FIG. 9 provides for both digital IF channels being programmed into the same gate array integrated circuit, it is understood that with only a slight modification each digital IF channel may be programmed into a separate gate array chip utilizing the programming VHDL files depicted in FIGS. 10A–10B, for example.

While the present invention has been described herein above in connection with one or more embodiments, it is understood that the embodiments were presented merely by way of example and not intended to limit the invention in any way, shape, or form. Rather, the present invention should be construed in breadth and broad scope according to the recitation of the following claims. Appendix I will be inserted between this section and the CLAIMS section and the pages numbered accordingly.

---

```
Digital Intermediate Frequency Processor
VHDL code (5 files - combined)
FILE 1
--
-- File: CLK_DIVIDER.vhd
-- created by Design Wizard: 09/12/01 16:12:15
--
--{{ Section below this comment is automatically maintained
--    and may be overwritten
--{entity {CLK_DIVIDER} architecture {Dataflow}}
library IEEE;
use IEEE.std_logic_1164.all;
entity CLK_DIVIDER is
    port (
        CLK_40: in STD_LOGIC;
        CLK_20: out STD_LOGIC;
        CLK_10: out STD_LOGIC
    );
end CLK_DIVIDER;
architecture Dataflow of CLK_DIVIDER is
signal CLK_20_INT: STD_LOGIC;
begin
    MAKE_CLK_20: process (CLK_40)
    variable set: integer range 0 to 1;
    begin
        if rising_edge (CLK_40) then
            if set = 1 then
                set := 0;
                CLK_20 <= '0';
                CLK_20_INT <= '0';
            else
                set := 1;
                CLK_20 <= '1';
                CLK_20_INT <= '1';
            end if;
        end if;
    end process MAKE_CLK_20;
    MAKE_CLK_10: process (CLK_20_INT)
    variable set2: integer range 0 to 1;
    begin
        if rising_edge (CLK_20_INT) then
            if set2 = 1 then
                set2 := 0;
                CLK_10 <= '0';
            else
                set2 := 1;
                CLK_10 <= '1';
            end if;
        end if;
    end process MAKE_CLK_10;
end architecture Dataflow;
FILE 2
-- CALC_IQ_MOD
library IEEE;
```

-continued

```
use IEEE.std_logic_1164.all;
entity CALC_IQ_MOD is
    port (
        RESET: in STD_LOGIC;
        DATA: in STD_LOGIC_VECTOR (11 downto 0);
        CLK_40: in STD_LOGIC;
        CLK_20: in STD_LOGIC;
        CLK_10: in STD_LOGIC;
        I_OUT: out STD_LOGIC_VECTOR (12 downto 0);
        Q_OUT: out STD_LOGIC_VECTOR (12 downto 0);
        Q_LOG: out STD_LOGIC_VECTOR (12 downto 0)
    );
end CALC_IQ_MOD;
library IEEE;
use ieee.numeric_std.all;
architecture dataflow of CALC_IQ_MOD is
signal DATA_MOD, LATCH_2, LATCH_3: integer range −2048 to 2048;
signal Q_OUT_TEMP, I_OUT_TEMP: integer range −4095 to 4095;
signal Q_OUT_TEMP_2, I_OUT_TEMP_2: integer range −4095 to 4095;
begin
    MAIN: process (RESET,CLK_40)
    variable Q_TEMP: integer range −4096 to 4096;
    variable DATA_TEMP: integer range 0 to 4095;
    variable DATA_BI: integer range −2048 to 2047;
    variable set: integer range 0 to 3;
        begin
            if RESET = '1' then
                I_OUT <= "0000000000000";
set all signals to 0
                Q_OUT <= "0000000000000";
                Q_TEMP := 0;
                DATA_MOD <= 0;
                LATCH_2 <= 0;
                LATCH_3 <= 0;
                Q_OUT_TEMP <= 0;
                I_OUT_TEMP <= 0;
                Q_OUT_TEMP_2 <= 0;
                I_OUT_TEMP_2 <= 0;
                Q_LOG <= "0000000000000";
            elsif rising_edge (CLK_40) then
                DATA_TEMP := to_integer(unsigned(DATA));
                DATA_BI := DATA_TEMP - 2048; --make DATA
bimodal
                if CLK_10 = '1' then --
creates −1,−1,1,1,−1,−1,1,1 etc.
                    DATA_MOD <= DATA_BI;
                else
                    DATA_MOD <= (−1)*DATA_BI;
                end if;
                LATCH_2 <= DATA_MOD;
                LATCH_3 <= LATCH_2;
                Q_TEMP := DATA_MOD + LATCH_3;
            -- take average
                if Q_TEMP > 4095 then --
keep within limits of 13 bits
                    Q_TEMP := 4095;
                elsif Q_TEMP < −4095 then
                    Q_TEMP := −4095;
                end if;
                Q_LOG <= std_logic_vector(to_signed ( Q_TEMP,
13)); -- goes on to log function
            -- set up at 40 MHz....
                Q_OUT_TEMP <= Q_TEMP;
                I_OUT_TEMP <= Q_OUT_TEMP;
            -- ...output at 20MHz
                if CLK_20 = '1' then
                    Q_OUT_TEMP_2 <= Q_OUT_TEMP; -- take
another average
                    Q_OUT <= std_logic_vector(
to_signed((Q_OUT_TEMP + Q_OUT_TEMP_2)/2,13));
                    I_OUT_TEMP_2 <= I_OUT_TEMP; -- take
another average
                    I_OUT <= std_logic_vector(
to_signed((I_OUT_TEMP + I_OUT_TEMP_2)/2,13));
                end if;
            end if;
    end process;
end architecture dataflow;
FILE 3
```

-continued

```
I_SQR_AND_Q_SQR
library IEEE;
use IEEE.std_logic_1164.all; -- allows STD_LOGIC
entity I_SQR_AND_Q_SQR is
    port (
        RESET: in STD_LOGIC;
        CLK_40: in STD_LOGIC;
        Q_LOG: in STD_LOGIC_VECTOR (12 downto 0);
        I_SQR_Q_SQR_SUM: out STD_LOGIC_VECTOR (23 downto 0)
    );
end I_SQR_AND_Q_SQR;
library IEEE;
use IEEE.numeric_std.all; -- allows "to_integer" and "std_logic_vector"
architecture dataflow of I_SQR_AND_Q_SQR is
signal Q_SQR, I_SQR: integer range 0 to 16777215; -- 24 bits
begin
    MAIN: process (RESET, CLK_40)
    variable Q_INT: integer range -4095 to 4095;
    begin
        if RESET = '1' then
            I_SQR_Q_SQR_SUM <= "000000000000000000000000";
            Q_SQR <= 0;
            I_SQR <= 0;
            Q_INT := 0;
        elsif rising_edge (CLK_40) then
    -- even after being added together, they will never exceed 24
bits
            Q_INT := to_integer(signed(Q_LOG)); --
(magnitude of vector around phase circle will not exceed certain
magnitude)
            Q_SQR <= (Q_INT * Q_INT);
            I_SQR <= Q_SQR;
            I_SQR_Q_SQR_SUM <= std_logic_vector(to_unsigned (
(I_SQR + Q_SQR), 24));
        end if;
    end process MAIN;
end dataflow;
FILE 4
AVERAGE
library IEEE;
use IEEE.std_logic_1164.all;
entity AVERAGE is
    port (
        RESET: in STD_LOGIC;
        CLK_40: in STD_LOGIC;
        I_SQR_AND_Q_SQR: in STD_LOGIC_VECTOR (23 downto 0);
        AVERAGE: out STD_LOGIC_VECTOR (24 downto 0)
    );
end AVERAGE;
library IEEE;
use IEEE.numeric_std.all; -- allows "to_integer" and "std_logic_vector"
architecture dataflow of AVERAGE is
signal LATCH, DATA_1: integer range 0 to 16777215; -- 24 bits
begin
    process (RESET, CLK_40)
    variable DATA_2: integer range 0 to 16777215; -- 24 bits
    begin
        if RESET = '1' then
            AVERAGE <= "000000000000000000000000";
            DATA_1 <= 0;
            DATA_2 := 0;
            LATCH <= 0;
        elsif rising_edge (CLK_40) then
            DATA_2 := to_integer(unsigned (I_SQR_AND_Q_SQR));
            LATCH <= DATA_2;
            DATA_1 <= LATCH;
            AVERAGE <= std_logic_vector(to_unsigned((DATA_1 +
DATA_2),25));
        end if;
    end process;
end dataflow;
FILE 5
--{entity {Voltage_dB} architecture {dataflow}}
-- created by Mike Fink on 9-10-01
-- this file takes the base_2 log of a 25 bit number...
-- ...and scales it to an 8 bit output (0–255) by using the formula
-- 12*log_2(X)-45
library IEEE;
```

```
use IEEE.std_logic_1164.all;
entity Voltage_dB is
    port (
        RESET: in STD_LOGIC;
        AVERAGE: in STD_LOGIC_VECTOR (24 downto 0);
        CLK_40: in STD_LOGIC;
        CLK_20: in STD_LOGIC;
        LOG_2: out STD_LOGIC_VECTOR (7 downto 0)
    );
end Voltage_dB;
library IEEE;
use IEEE.numeric_std.all; -- allows "to_integer" and "std_logic_vector"
architecture dataflow of Voltage_dB is
signal LOG: integer range 0 to 3000;
signal SC_LOG_2: integer range 0 to 300;
signal AVG_1: integer range 0 to 255;
begin
MAIN: process (RESET, CLK_40)
variable X: STD_LOGIC;
variable MANTISSA_4: STD_LOGIC_VECTOR (3 downto 0);
variable MANTISSA_5: STD_LOGIC_VECTOR (4 downto 0);
variable AVERAGE_2: STD_LOGIC_VECTOR (24 downto 0);
variable INDEX: integer range 0 to 30;
variable INDEX_2: integer range 0 to 3000;
variable MANTISSA_INT: integer range 0 to 100;
variable SC_LOG: integer range 0 to 300;
variable AVG: integer range 0 to 300;
variable normal: boolean;
    begin
    if RESET = '1' then
        LOG_2 <= "00000000";
        SC_LOG := 0;
        SC_LOG_2 <= 0;
        LOG <= 0;
        INDEX_2 := 0;
        MANTISSA_INT := 0;
        INDEX := 0;
        MANTISSA_4 := "0000";
        MANTISSA_5 := "00000";
        AVERAGE_2 := "0000000000000000000000000";
        AVG := 0;
        AVG_1 <= 0;
    elsif
        rising_edge(CLK_40) then
        AVERAGE_2 := AVERAGE;
        normal := true;
        shifter: for i in 1 to 20 loop
            X := AVERAGE_2(25-i); -- looking for first
1
            if      X = '1' then
                    INDEX := 25-i;
                    MANTISSA_5 := AVERAGE_2 (24-i downto 20-i); --
out of range if i > 20
                    exit shifter;
            elsif   i = 20 then
                    X := AVERAGE_2(24-i); -- look at 4th bit
..000...1 XXXX
                    if  X = '1' then
                        normal := false;
                        INDEX := 4;
                        MANTISSA_4 := AVERAGE_2 (3 downto 0);
                        case (MANTISSA_4) is
                            when "0000" => MANTISSA_INT := 00;
                            when "0001" => MANTISSA_INT := 09;
                            when "0010" => MANTISSA_INT := 17;
                            when "0011" => MANTISSA_INT := 25;
                            when "0100" => MANTISSA_INT := 34;
                            when "0101" => MANTISSA_INT := 42;
                            when "0110" => MANTISSA_INT := 50;
                            when "0111" => MANTISSA_INT := 54;
                            when "1000" => MANTISSA_INT := 60;
                            when "1001" => MANTISSA_INT := 68;
                            when "1010" => MANTISSA_INT := 72;
                            when "1011" => MANTISSA_INT := 77;
                            when "1100" => MANTISSA_INT := 85;
                            when "1101" => MANTISSA_INT := 88;
                            when "1110" => MANTISSA_INT := 93;
                            when "1111" => MANTISSA_INT := 98;
                            when others => MANTISSA_INT := 0;
```

```
                    end case;
                    exit shifter;
            elsif AVERAGE_2 = "00000000000000000001111"
then
                    normal := false;
                    INDEX := 3;
                    MANTISSA_INT := 94;
                    exit shifter;
            elsif AVERAGE_2 = "00000000000000000001110"
then
                    normal := false;
                    INDEX := 3;
                    MANTISSA_INT :=
85;
                    exit shifter;
            else
                    normal := false;
                    INDEX := 3; -- all
values that reach here will be
                    MANTISSA_INT := 75; -- 0 on the
scaled log, so this makes
                    exit shifter; -- EXPONENT
at 375 so EXPONENT_2 does
                end if; -- not
go below zero
            end if;
        end loop shifter;
        INDEX_2 := INDEX * 100;
        if normal = true then
        case (MANTISSA_5) is
            when "00000" => MANTISSA_INT := 02;
            when "00001" => MANTISSA_INT := 07;
            when "00010" => MANTISSA_INT := 11;
            when "00011" => MANTISSA_INT := 15;
            when "00100" => MANTISSA_INT := 19;
            when "00101" => MANTISSA_INT := 23;
            when "00110" => MANTISSA_INT := 27;
            when "00111" => MANTISSA_INT := 30;
            when "01000" => MANTISSA_INT := 34;
            when "01001" => MANTISSA_INT := 37;
            when "01010" => MANTISSA_INT := 41;
            when "01011" => MANTISSA_INT := 44;
            when "01100" => MANTISSA_INT := 48;
            when "01101" => MANTISSA_INT := 51;
            when "01110" => MANTISSA_INT := 54;
            when "01111" => MANTISSA_INT := 57;
            when "10000" => MANTISSA_INT := 60;
            when "10001" => MANTISSA_INT := 63;
            when "10010" => MANTISSA_INT := 66;
            when "10011" => MANTISSA_INT := 69;
            when "10100" => MANTISSA_INT := 71;
            when "10101" => MANTISSA_INT := 74;
            when "10110" => MANTISSA_INT := 77;
            when "10111" => MANTISSA_INT := 79;
            when "11000" => MANTISSA_INT := 82;
            when "11001" => MANTISSA_INT := 85;
            when "11010" => MANTISSA_INT := 87;
            when "11011" => MANTISSA_INT := 89;
            when "11100" => MANTISSA_INT := 92;
            when "11101" => MANTISSA_INT := 94;
            when "11110" => MANTISSA_INT := 97;
            when "11111" => MANTISSA_INT := 99;
            when others => MANTISSA_INT := 0;
        end case;
        end if;
        LOG <= INDEX_2 + MANTISSA_INT;
        if LOG < 375 then -- this is a double
check to make sure SC_LOG does not go below 0
            SC_LOG := 0; -- (this problem
may occur on startup with unknown values present)
        else
            SC_LOG := (123 * (LOG - 375)) / 1024; -- .12*(X-
375) ... 12*X-45
        end if;
        SC_LOG_2 <= SC_LOG; -- get two samples
        if CLK_20 = '1' then -- output at 20MHz (in sync with I
and Q)
            AVG := (SC_LOG + SC_LOG_2)/2; -- get average
            if AVG > 255 then
```

-continued

```
            AVG := 255;
         end if;
         AVG_1 <= AVG; -- get two more
samples
         LOG_2 <= std_logic_vector(to_unsigned((AVG +
AVG_1)/2,8)); -- average again and..
                     -- ..convert output
      end if;
   end if;
end process MAIN;
end dataflow;
```

What is claimed is:

1. Apparatus for processing a signal of a predetermined intermediate frequency (IF) to generate in-phase (I) and quadrature (Q) components thereof, said apparatus comprising:

an analog-to digital converter circuit for sampling and digitizing the IF signal to generate digitized data samples thereof at a sampling rate that produces consecutive digitized data samples that are separated in phase by a substantially fixed phase angle $2\pi/n$, where n is an integer greater than zero;

first digital circuitry coupled to said analog-to digital converter circuit for demodulating said digitized data samples by multiplying every n consecutive digitized data samples with n respectively corresponding digital reference samples; and second digital circuitry coupled to said first digital circuitry for combining selected ones of the demodulated samples based on the substantially fixed phase angle to generate digital data samples of said I and Q components of the IF signal.

2. The apparatus of claim 1 including a clock circuit for producing a pulsed clock signal at a pulse rate proportional to the sampling rate; and wherein the analog-to-digital converter circuit, and first and second digital circuits are governed by said clock signal to perform their operations sequentially and synchronously in accordance with said pulse rate.

3. The apparatus of claim 2 wherein the first digital circuitry includes circuitry for demodulating the digitized data samples in the sequential order they are being digitized by the analog-to digital converter circuit; and wherein the second digital circuitry includes circuitry for selecting ones of the demodulated samples for combination from the sequential order they are being demodulated by the first digital circuitry.

4. The apparatus of claim 1 wherein n equals four and the fixed phase angle is substantially $\pi/2$.

5. The apparatus of claim 4 wherein the first digital circuitry includes circuitry for multiplying every four consecutive digitized data samples with four respectively corresponding digital reference samples comprising the four codes of 1,1, −1, −1.

6. The apparatus of claim 4 wherein the second digital circuitry includes circuitry for combining each present demodulated sample with a demodulated sample delayed by two periods of the sampling rate from the present demodulated sample to generate digital data samples of the I and Q component, wherein the digital data samples of the I and Q components are being generated respectively at alternating periods of the sampling rate.

7. The apparatus of claim 6 wherein the combining circuitry including circuitry for 2-sample averaging of the digital data samples of the I component to produce averaged data samples of the I component: and circuitry for 2-sample averaging of the digital data samples of the Q component to produce averaged data samples of the Q component.

8. The apparatus of claim 1 including third digital circuitry coupled to the second circuitry for generating digital data samples of a log video component of the IF signal from the digital data samples of the I and Q components.

9. The apparatus of claim 8 wherein the third digital circuitry comprises:

fourth circuitry coupled to the second circuitry for squaring each digital data sample of the I and Q components;

fifth circuitry for adding together each present squared data sample with a squared data sample delayed by a period of the sampling rate from the present squared data sample to generate $I^2+Q^2$ digital data samples; and sixth circuitry for determining the logarithm base 2 of the $I^2+Q^2$ digital data samples to generate the digital data samples of the log video component.

10. The apparatus of claim 9 including circuitry for 2-sample averaging of the digital data samples of the log video component to produce averaged data samples of the log video component.

11. The apparatus of claim 8 wherein the first, second and third digital circuitry are programmed into a gate array integrated circuit.

12. The apparatus of claim 11 wherein the gate array integrated circuit is a field programmable gate array integrated circuit.

13. The apparatus of claim 1 wherein the predetermined IF is approximately 30 MHz; and wherein the sampling rate is approximately 40 MHz.

14. A digital intermediate frequency (IF) processor for processing IF sum ($\Sigma$) and delta ($\Delta$) signals to generate in-phase (I) and quadrature (Q) components of each of the $\Sigma$ and $\Delta$ signals, said processor comprising:

a first analog-to digital converter circuit for sampling and digitizing the IF $\Sigma$ signal to generate digitized data samples thereof at a sampling rate that produces consecutive digitized data samples of the IF $\Sigma$ signal that are separated in phase by a substantially fixed phase angle $2\pi/n$, where n is an integer greater than zero;

a second analog-to digital converter circuit for sampling and digitizing the IF $\Delta$ signal to generate digitized data samples thereof at the sampling rate to produce consecutive digitized data samples of the IF $\Delta$ signal that are separated in phase by the substantially fixed phase angle;

a first digital IF channel coupled to said first analog-to digital converter circuit for processing the digitized data samples of the IF $\Sigma$ signal to generate digitized data samples of the I and Q components thereof;

a second digital IF channel coupled to said second analog-to digital converter circuit for processing the digitized data samples of the IF Δ signal to generate digitized data samples of the I and Q components thereof; and wherein each of the I and Q digital IF channels including:

first digital circuitry coupled to the corresponding analog-to digital converter circuit for demodulating said digitized data samples by multiplying every n consecutive digitized data samples with n respectively corresponding digital reference samples; and second digital circuitry coupled to said first digital circuitry for combining selected ones of the demodulated samples based on the substantially fixed phase angle to generate digital data samples of said I and Q components of the corresponding IF signal.

15. The processor of claim 14 including a clock circuit for producing a pulsed clock signal at a pulse rate proportional to the sampling rate; and wherein the first and second analog-to-digital converter circuits, and first and second digital IF channels are governed by said clock signal to perform their operations sequentially and synchronously in accordance with said pulse rate.

16. The processor of claim 15 wherein each first digital circuitry includes circuitry for demodulating the digitized data samples of its corresponding IF signal in the sequential order they are being digitized by the corresponding analog-to digital converter circuit; and wherein each second digital circuitry includes circuitry for selecting ones of the demodulated samples of its corresponding IF signal for combination from the sequential order they are being demodulated by the first digital circuitry coupled thereto.

17. The processor of claim 14 wherein n equals four and the fixed phase angle is substantially $\pi/2$.

18. The processor of claim 14 wherein each digital IF channel includes third digital circuitry coupled to the corresponding second circuitry for generating digital data samples of a log video component of the corresponding IF signal from the digital data samples of the I and Q components thereof.

19. The processor of claim 18 wherein both of the first and second digital IF channels are programmed into a gate array integrated circuit.

20. The processor of claim 19 wherein the gate array integrated circuit is a field programmable gate array integrated circuit.

21. The processor of claim 14 wherein the IF of each of the Σ and Δ signals is approximately 30 MHz; and wherein the sampling rate is approximately 40 MHz.

22. An avionic system for detecting and decoding transponder reply signals from received radio frequency (RF) signals, said system comprising:

an antenna for receiving the RF signals and configured to produce sum (Σ) and delta (Δ) component signals thereof;

an RF receiver circuit for demodulating the RF Σ and Δ component signals into intermediate frequency (IF) Σ and Δ component signals, respectively;

a first analog-to digital converter circuit for sampling and digitizing the IF Σ signal to generate digitized data samples thereof at a sampling rate that produces consecutive digitized data samples of the IF Σ signal that are separated in phase by a substantially fixed phase angle $2\pi/n$, where n is an integer greater than zero;

a second analog-to digital converter circuit for sampling and digitizing the IF Δ signal to generate digitized data samples thereof at the sampling rate to produce consecutive digitized data samples of the IF Δ signal that are separated in phase by the substantially fixed phase angle;

a first digital IF channel coupled to said first analog-to digital converter circuit for processing the digitized data samples of the IF Σ signal to generate digitized data samples of the in-phase (I), quadrature (Q) and log video (log V) components thereof;

a second digital IF channel coupled to said second analog-to digital converter circuit for processing the digitized data samples of the IF Δ signal to generate digitized data samples of the I, Q and log V components thereof; and a reply processor for processing the digitized data samples of the I, Q and log V components of each of the IF Σ and Δ signals to detect and decode transponder reply signals.

23. The system of claim 22 wherein each of the first and second digital IF channels is programmed into a gate array integrated circuit.

24. The system of claim 22 wherein both of the first and second digital IF channels are programmed into a gate array integrated circuit.

25. The system of claim 24 wherein the gate array integrated circuit is a field programmable gate array integrated circuit.

26. The system of claim 22 wherein the IF of each of the Σ and Δ signals is approximately 30 MHz; and wherein the sampling rate is approximately 40 MHz.

27. The system of claim 22 including a clock circuit for producing a pulsed clock signal at a pulse rate proportional to the sampling rate; and wherein the first and second analog-to-digital converter circuits, and first and second digital IF channels are governed by said clock signal to perform their operations sequentially and synchronously in accordance with said pulse rate.

28. The system of claim 22 wherein n equals four and the fixed phase angle is substantially $\pi/2$.

* * * * *